April 24, 1962 P. KRAUSS ET AL 3,031,521
BUSWAY SYSTEM
Filed May 26, 1958 3 Sheets-Sheet 1
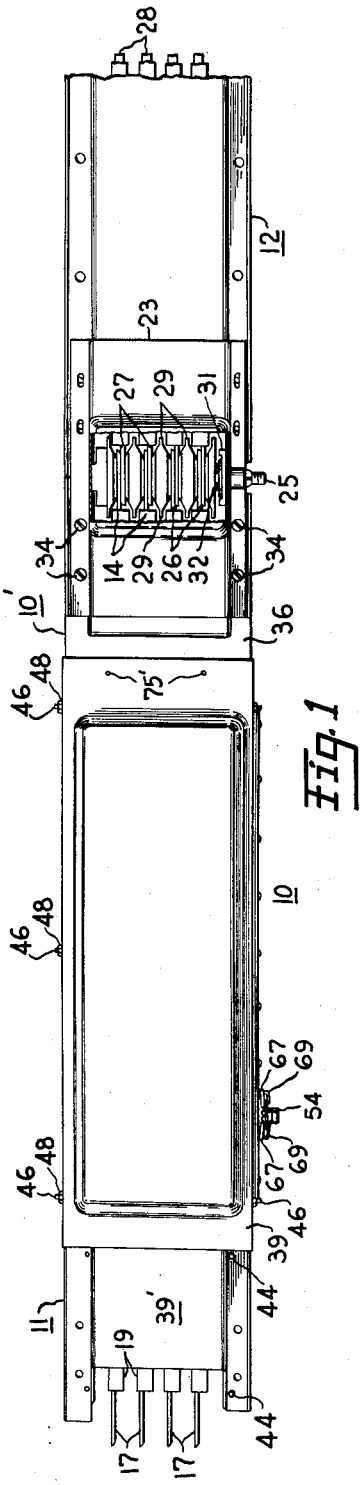
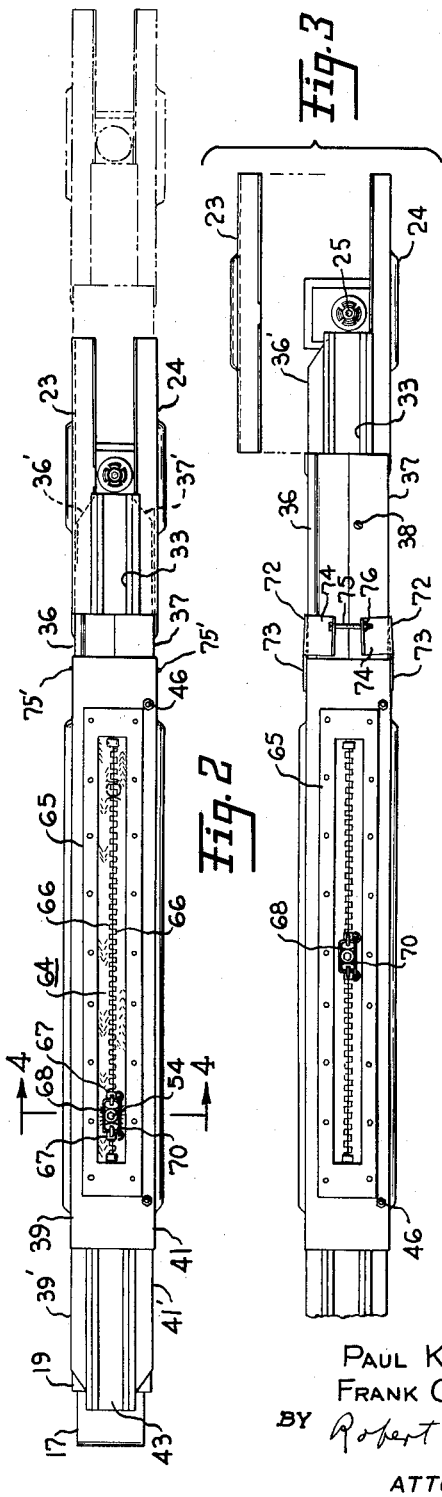
INVENTORS
PAUL KRAUSS,
FRANK C. JOHNSTON
BY Robert T. Casey
ATTORNEY INVENTORS
PAUL KRAUSS,
FRANK C. JOHNSTON
BY Robert H. Casey
ATTORNEY United States Patent Office 3,031,521
Patented Apr. 24, 1962

3,031,521
BUSWAY SYSTEM
Paul Krauss, Burlington, Vt., and Frank C. Johnston, West Hartford, Conn., assignors to General Electric Company, a corporation of New York
Filed May 26, 1958, Ser. No. 737,554
6 Claims. (Cl. 174—88)

Our invention relates to electric power busway systems, and particularly to busway systems for use in industrial and commercial buildings.

Electric power busway systems are customarily manufactured in prefabricated standard sections of predetermined lengths which are assembled and installed in buildings such as by hanging them from the ceiling or supporting them from a wall. In an attempt to meet the needs of the majority of buildings, various standard-length sections of such busway are customarily offered. Regardless of the number of different lengths offered, however, it is often necessary to manufacture special sections of particular length to meet a particular need presented by the dimensional limitations of a particular building. The manufacture of such special-length sections is expensive and requires a substantial amount of time. In addition, the possibility of error in measuring the building's dimensions, so as to specify the lengths needed, is always present.

It is an object of the present invention to provide a busway system including prefabricated sections which sections may be selectively combined to provide a busway run of any desired length from a very short distance up, in an infinite number of gradations.

It is another object of the present invention to provide an adjustable-length busway section requiring only a single bolt to tighten all of a plurality of bus bar conductors.

It is another object of the present invention to provide an adjustable-length busway section which has no openings in the intermediate portion of the housing thereof in any of its adjusted conditions permitting access to the bus bar conductors within the external housing.

It is another object of the present invention to provide an adjustable-length busway section which provides a maximum degree of rigidity lengthwise thereof even though utilizing only a single clamping bolt for all of the bus bar conductors.

In accordance with the invention, a busway system is provided comprising prefabricated sections of predetermined different lengths, the lengths differing from each other in steps of equal predetermined magnitude, and a busway section whose length may be varied by the user at the time of installation by an amount equal to the magnitude of such predetermined steps.

In accordance with another aspect of the invention, a busway system is provided including an adjustable-length busway section having a plurality of parallel bus bar conductors arranged in two groups with portions in overlapping slidable contacting engagement, the contact portions being as long as the total amount of adjustment desired, and single clamping means extending transversely of the busway housing for clamping all of said overlapped bus bar ends together.

In accordance with a further aspect of the invention, housing means is provided for housing each of both of said groups of bus bar conductors, the housings being telescoped in sliding engagement, the bus bar clamping means being mounted stationary relative to one of said housing sections and the other of the housing sections being provided with an elongated clearance slot to permit access to such adjusting means in all adjusted positions of the sections, and closure means for closing all other portions of said access slot in all adjusted positions.

The aspects of the invention considered to be novel will be specifically pointed out in the appended claims. The particular embodiment of the invention disclosed herein, however, will be clearly understood by reference to the following detailed description, taken in conjunction with the accompanying drawings, in which:

FIGURE 1 is a top plan view of a portion of a busway system including an adjustable-length busway section constructed in accordance with the invention;

FIGURE 2 is a side elevation of the adjustable busway section of FIGURE 1, shown in the minimum-length condition, the maximum-length condition being indicated in dotted lines;

FIGURE 3 is a side elevation view of the busway section of FIGURE 1, shown in an intermediate adjusted-length condition and with a joint cover member in displaced position;

Figure 4:
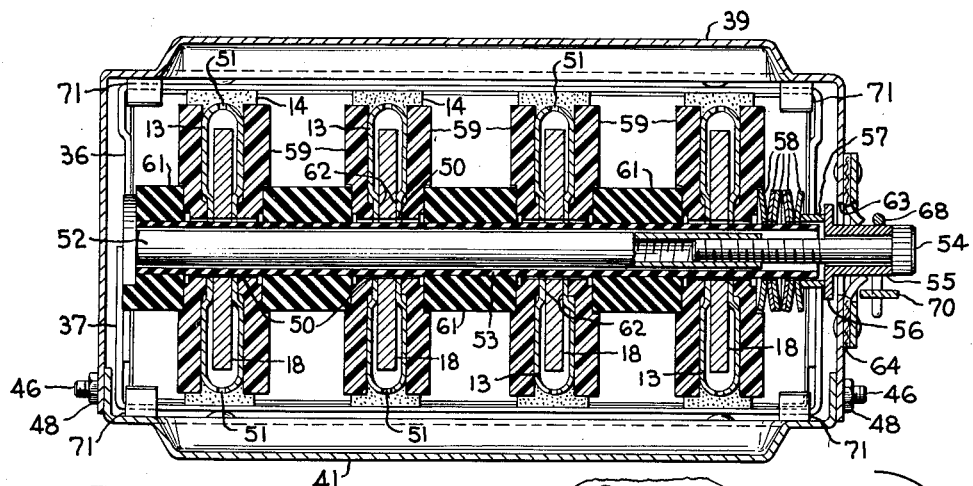
FIGURE 4 is a sectional view on enlarged scale taken on the lines 4—4 of FIGURE 2.

In the drawings, the invention is shown as embodied in a busway system incorporating an adjustable-length busway section 10, having a first portion 10′ which, for convenience, will be referred to as the "fixed" portion, and a second portion 11, which will for convenience be referred to as the "movable" portion. The fixed portion 10′ is connected, by means to be described, to a previously installed stationary section a portion of which is shown at 12.

Figure 5:
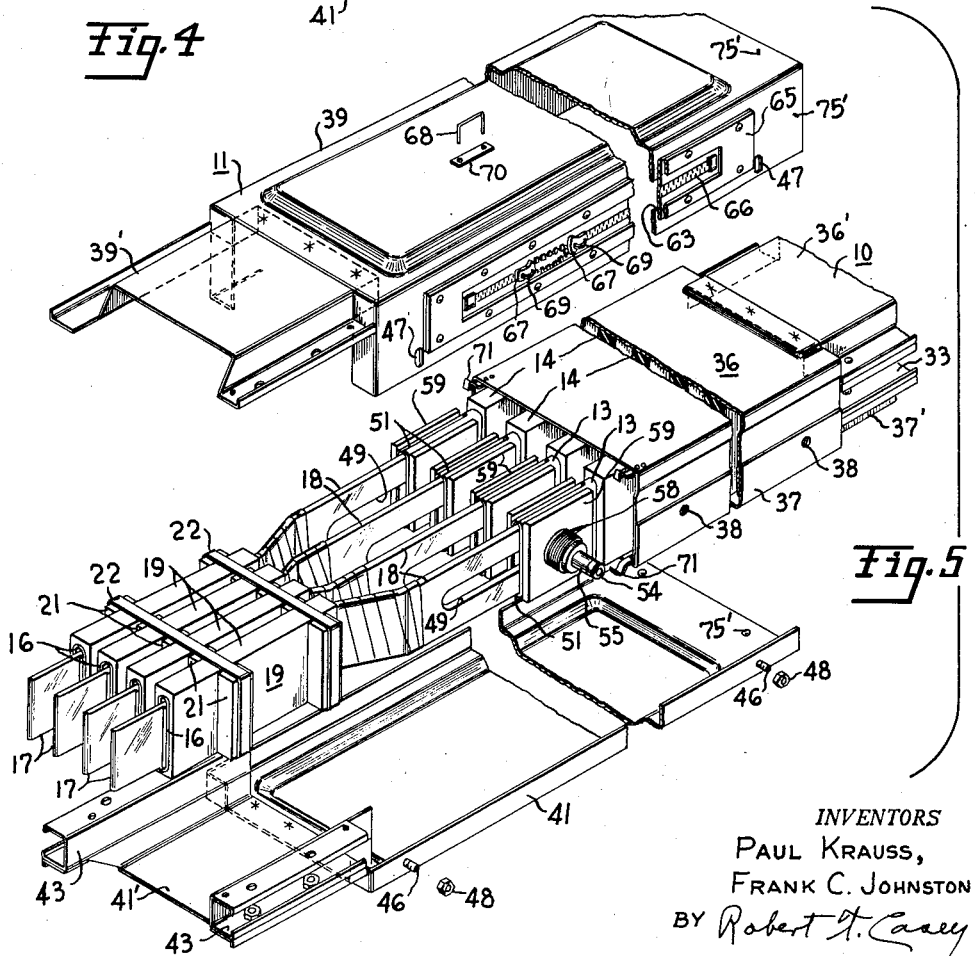
FIGURE 5 is an exploded perspective view of the adjustable-length busway section of FIGURE 1, shown in an intermediate-length condition.

The fixed portion 10′ of the adjustable-length section comprises a plurality of parallel tubular bus bar conductors 13, see FIGURE 5, each having a coating 14 of insulating material such for example as butyl synthetic rubber. The movable section 11 includes a number of generally tubular conductors 16, having contact blade portions 17 fixedly attached in one end thereof such as by welding, and each conductor 16 also having a slidable contact portion 18 formed of a solid conductive strap fixedly attached in the opposite end thereof such as by welding and including portions extending within the corresponding tubular bus bar conductors 13 of the section 10.

The slidable contact portions 18 are preferably spaced relatively widely apart to provide adequate through-air clearance between adjacent exposed portions and to reduce the magnitude of magnetic forces acting thereon during a short-circuit, while the intermediate portions of the conductors 16 are spaced relatively closely together to minimize size and weight of the busway and to reduce reactance. The bus bars 16 also include a suitable insulation coating 19 over the intermediate portions thereof similar to the coating 14 on bars 13. The bus bars 16 are supported in insulated spaced-apart relation by means of insulating spacers 21, the entire assembly of insulated bus bars and spacers being held in tightly assembled relation by a surrounding steel strap 22, which is under tension and compresses the bus bar assembly tightly together. This insulating and supporting construction is substantially as shown and claimed in application Serial Number 619,580, filed October 31, 1956, by L. E. Fisher et al., now Patent No. 2,948,771, and assigned to the same assignee as the present invention.

The conductors 13 of the section 10 are mounted and supported in insulated relation to each other by insulating and supporting means, not shown, similar to the insulators 21 and strap assembly 22 used with the conductors 16.

The stationary section 10 includes a first housing portion comprising a removable top joint cover 23 and a removable bottom joint cover 24 which are adapted to cover a clamp-type joint operated by a clamping bolt 25 and are connected to the main housing by screws 34. The clamp joint operated by the bolt 25 may be of any suitable type such, for instance, as shown in our copending application Serial Number 737,934, now Patent No. 3,004,097, filed on the same day as the present application and assigned to the same assignee as the present invention.

As disclosed in the aforementioned application, the conductors 13 are provided with contact filler plugs 26 projecting beyond the ends thereof at one end of the adjustable section, and adapted to overlap corresponding bus bar terminations 27 of the bus bar conductors 28 of the relatively stationary adjacent section 12 as shown in FIGURE 1. Insulating spacers 29 are provided between the overlapped bus bar ends and between the outer pairs of overlapped bus bar ends and the adjacent side walls of the busway housing. A pressure plate 31 is contained within the busway housing and carries a threaded portion receiving the pressure bolt 25 which carries a plurality of dished circular spring members 32. When the bolt 25 is turned inwardly, the resilient members 32 are pressed against the insulating spacers 29 compressing the overlapped bus bar ends against each other and against the opposite inner wall of the housing, thereby providing a firm and dependable electrical connection between busway sections by operation of a single clamping bolt, which, moreover, is accessible from outside the housing and which is at the grounded potential of the busway housing.

The housing proper for the fixed section 10 comprises a top cover assembly 36, 36', a bottom cover assembly 37, 37', and a pair of generally channel-shaped spacers 33. The cover members 36 and 37 are relatively wide and comprise partially interfitting generally U-shaped members joined by suitable means such as screws 38. The cover members 36' and 37' are relatively narrow and are generally channel-shaped, with outwardly directed flanges, by which the cover members are secured to the spacers 33 such as by rivets. The portion 36' of the top-cover assembly extends partly within the portion 36 and is suitably attached thereto such as by welding. The portion 37' of the bottom cover assembly likewise extends partly within the portion 37 and is attached thereto as by welding. The end of the section 10 comprising the top portion 36', the bottom portion 37', and the spacer 33, therefore constitute a housing section of standardized dimension, such as used in standard busway section, and may therefore be readily joined to such standard sections. The top housing section, comprising the cover 36 and the cover 36', as well as the bottom section cover, comprising the cover 37 and the cover 37', are dimensioned so that when joined, they clamp the conductor assemblage comprising the insulated conductors 13 and their insulating spacers and clamping straps in tight engagement between the top and bottom cover members to prevent any relative movement therebetween.

The housing for the movable section 11 likewise comprises a top cover assembly and a bottom cover assembly. The top cover assembly includes a wide cover portion 39 which has rigidly attached thereto such as by welding a narrow cover portion 39'. The bottom housing cover assembly likewise comprises a generally channel-shaped, relatively wide cover portion 41, which has rigidly attached thereto such as by welding a narrow cover portion 41'. The cover portions 39' and 41' are connected to the spacer members 43 by suitable means such as by rivets 44. The main bottom housing section 41 carries bolts 46 preferably rigidly attached thereto and serving to interconnect the bottom section 41 to the main top section 39 by extending through apertures 47 and receiving retaining nuts 48.

It will be observed therefore that each of the portions 10 and 11 of the adjustable-length section comprises a number of parallel bus bars having a first portion spaced relatively closely together and another portion spaced relatively widely apart and a housing which also provides two portions, one of relatively narrow width enclosing the closely spaced bus bar ends, and one of relatively wide width enclosing the relatively widely spaced bus bar portions, the enlarged housing portion of one portion being received in telescopic engagement within the enlarged housing portion of the other section.

For the purpose of providing an adjustable conductive engagement, the contact portions 18 of the conductors 16 are provided with an elongated exposed contact portion including elongated slots 49. The slots 49 are preferably closed, that is, they terminate short of the ends of the contact portions 18. This is for the purpose of limiting the separating movement of the two portions 10 and 11. The tubular bus bar conductors 13 of the section 10 are slotted at opposite edges thereof 51 so that the side portions thereof adjacent the ends are permitted to move transversely a short distance.

The bus bar conductors 13 also are provided with apertures 50 to receive a transversely extending clamping assembly including an elongated headed retaining rod 52 having an insulating sheath 53 extending thereover, and having a tapped axial bore extending therewithin from its inner end, receiving an elongated clamping bolt 54 in threaded engagement therewith. The head of the bolt 54 is of the socket type and bears against a generally cylindrical pressure member 55 carried by the bolt and having a flange 56 which in turn bears against a cylindrical collar 57 and a plurality of dished resilient circular members or "Belleville" washers 58.

Each of the bus bars 13 has a pair of insulating pressure plate members 59 on either side of the contact portion thereof, the plates 59 being generally rectangular and of relatively wide dimension. Insulating spacer members 61 are interposed between adjacent plates 59 and between the plate 59 and the head of the retaining rod 52. The conductors 13 have their contact portions adjacent the ends thereof provided with generally circular inwardly embossed contact portions 62.

The operation of the clamping mechanism will be understood by reference to FIGURE 4. Turning movement of the clamping bolt 54 draws it toward the retaining rod 52 and compresses the pressure member 55 and the collar 57 against the assembly of Belleville washers 58 which in turn exert pressure against the insulators 59 and compresses the embossed portions 62 of the conductors 13 against the inner conductors 18. Since the bus bar contact areas are arranged in mechanical series arrangement, the pressure applied by the resilient members 58 will be equal on all bus bar contacting surfaces.

For the purpose of enclosing the bus bar surfaces 18 and guarding against any possible accidental contact from outside regardless of the adjusted position in which the sections may be used, closure means is provided for closing all openings of the housing members in any such position. For this purpose, the main top housing section 39 for section 11 is provided with an elongated aperture 63 which is of greater extent than the desired amount of movement of the two parts relative to each other, and dimensioned to permit the clamping bolt 54 to project outside of both housing members to be readily accessible from outside the assembly. The elongated slot opening 63 in the housing member 39 is closed in all conditions of the adjustable section by means of a flexible closure member 64 such as fire-resistant fabric or plastic incorporating a slide fastener or "zipper" type of closure member having spaced slide fastener teeth 66. The closure member 64 is held in place between a plate 65 and the side of the housing 39 by means of rivets. In order that the slide fastener opening shall be closed at all portions except where the clamping bolt 54 and pressure member 55 project therethrough, there is provided a pair of spaced-apart slide fastener closure members 67 disposed in confronting relation to close the slide fastener from opposite ends thereof. The closure members 67 are retained in position closely adjacent the pressure member 55 by means of an interconnecting link 68 comprising a generally U-shaped wire bail interengaging hook portions 69 on the closure members 67 and retained by suitable means such as by means of retaining clip 70, the ends of the wire bail extending through holes in the clip 70 and being return-bent thereover.

In operation, as the movable section 11 is drawn outwardly and the contact portions 18 of the bus bars 16 are withdrawn from the tubular bus bars 13 of the section 10, the pressure member 55 engages one of the closure members 67 which in turn moves the other closure member 67 so that the slide fastener is opened ahead of the clamping bolt and simultaneously closed immediately therebehind. This construction eliminates all possibility of accidental contact with the exposed bus bar surfaces 18, and also minimizes possible chance of damage by fire as well as keeping dust and other foreign material out of the sliding joint.

The telescoping engagement of the contact portions 18 within the tubular conductors 13 assures accurate alignment of the movable section with respect to the stationary section and rigidity of the assembly, as does the telescoping arrangement of the housing sections.

The housing of the section 10 is provided with grounding clips 71 on the top section 36 and also on the bottom section 37, which provide a permanent sliding contact which serves as a ground connection between both housing portions at all times.

The cover members 39 and 41 of the section 11 are also provided with raised bearing areas on the inner surfaces thereof comprising buttons or inserts 75' of suitable material such as nylon plastic, to facilitate sliding movement of the telescoped housings.

In order to provide additional rigidity to the assembly, a clamp assembly is provided as shown in FIGURE 3 and including generally U-shaped top and bottom clamping members 72 having the web or bight portion of the U extended as at 73 and welded to the cover members 39 and 41 respectively. The members 72 also have outwardly directed flanges 74, and are clamped together at one end by means of bolts 75 engaging nuts 76 welded to the flange portions. It will be observed that since the surface of the section 11, on which the portion 73 rests, is higher than the surface of the housing portions 36 and 37 of the section 10, the U-shaped portions extend at a slight angle to the cover when clamped. This causes the forward edge thereof to bite into the metal of the housing portions 36 and 37, providing a good grounding connection, as well as mechanically strengthening the assembly.

Figure 6:
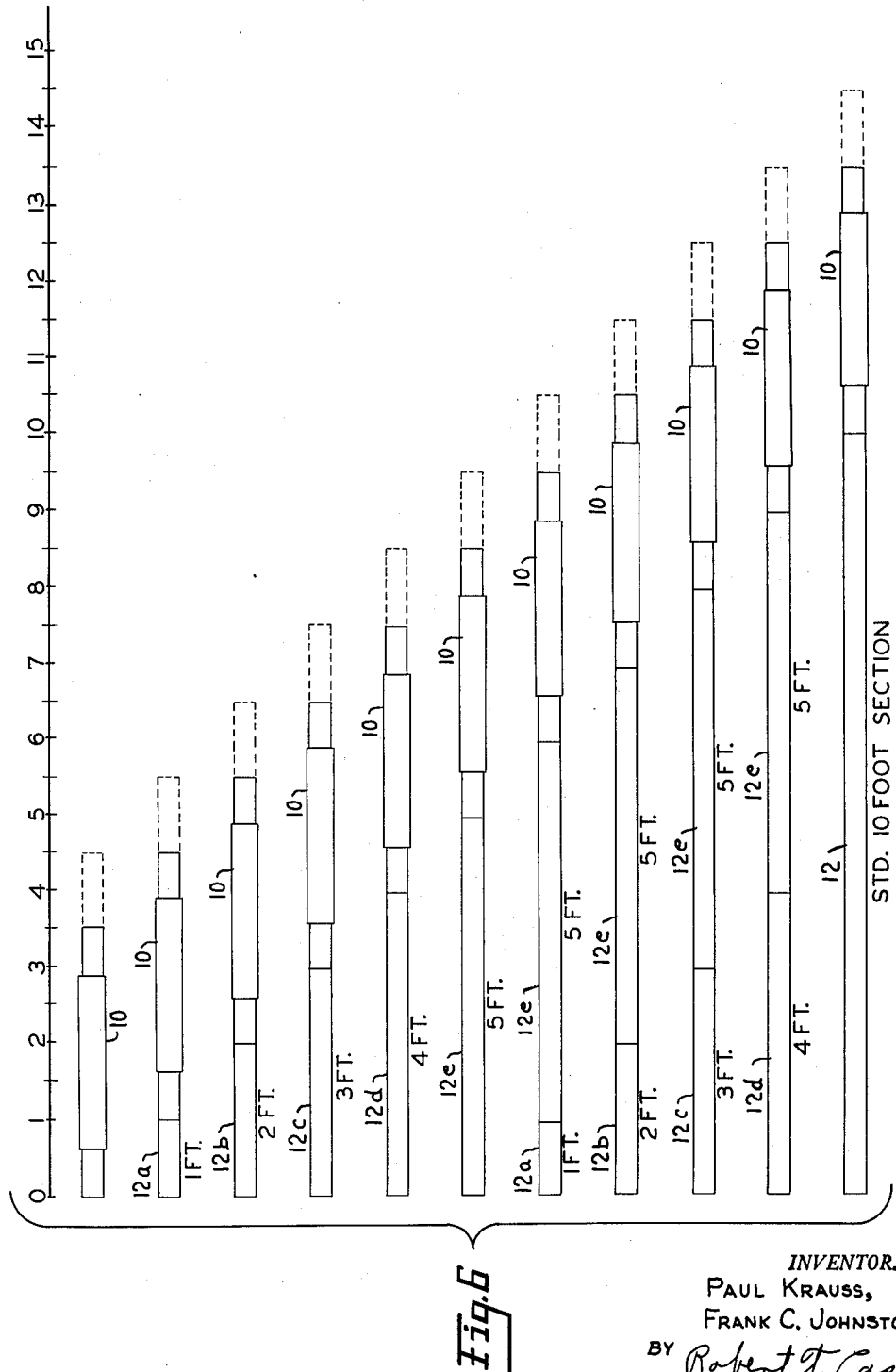
FIGURE 6 is a semi-schematic representation of a series of busway lengths in accordance with the invention, shown combined with an adjustable length to cover certain distances.

Referring to FIGURE 6, the busway system of the present invention includes fixed-length busway sections such as shown at 12, FIGURE 1, and diagrammatically at 12a–12f, FIGURE 6, which are of predetermined different lengths. The lengths of the sections 12a–12f are selected so that when combined with the adjustable section 10, a continuous length of busway of any desired length equal to or greater than the minimum length of the adjustable section 10 may be provided, with an infinite number gradations of length possible.

Accordingly, the adjustable length is made adjustable with an infinite possible number of settings within a range of 3½ feet to 4½ feet. Fixed-length sections 12a–12e are also provided having lengths of 1 foot, 2 feet, 3 feet, 4 feet, 5 feet, respectively, as well as a "standard-length" section 12f having a length of 10 feet.

Referring to the diagram, if it is desired to fill a gap ranging from 3½ feet to 4½ feet, the adjustable section itself is used. To fill a space 4½ feet to 5½ feet, the adjustable section is combined with the 1-foot section. To fill a space 5½ feet to 6½ feet, the adjustable section is combined with the 2-foot section, and so forth. For lengths between 9½ feet up to 12½ feet, the shorter lengths are combined with a 5-foot length.

It will be observed that the increment of length of each fixed-length section over the preceding one is the same as the amount of adjustability provided in the adjustable section. By this means, all possible distances greater than the minimum length of the adjustable-length section may be covered in infinite gradations or increments, by selectively combining the adjustable section, five "short" fixed-length sections, and a "standard" 10-foot section.

Thus, a busway system is provided which may be used to fill virtually any needs which may arise, with a substantial amount of adjustment possible. Where heretofore, for example, it has been necessary for a contractor to measure distances carefully since an error greater than ⅛" could render a given length of busway useless and require ordering of another special length, the present system allows the contractor a latitude of plus-or-minus 6 inches for any distance he may be covering.

Moreover, when it is desired to relocate the busway, such as when machines or other power-consuming devices are relocated, the stocking of a few "short" lengths, differing in length by an increment equal to the amount of adjustment of the adjustable length, assures that the system can be adapted to virtually any new location.

What we claim as new and desire to secure by Letters Patent of the United States is:

1. An adjustable-length busway section comprising a plurality of elongated parallel bus bar conductors, each of said bus bar conductors including at least two relatively movable sections having contact portions extending in overlapping relation and slidable to vary the effective length of said conductor, a housing surrounding said overlapping contact portions, clamping means for exerting clamping pressure on said bus bar contact portions, means for adjusting said pressure on said contact portions, said adjusting means and said housing member being moved relative to each other during changing of the effective length of said conductors, said housing member including an elongated access opening for providing access to said adjusting means at all times, closure means for closing said opening at all parts except a desired part comprising a slide fastener and a pair of spaced-apart slide fastener closure members, and means including said clamping means for moving said closure members along said slide fastener in said predetermined spaced-apart relation in response to relative movement between the clamping means and the housing.

2. An adjustable-length busway section comprising a first elongated generally rectangular housing portion, a second elongated generally rectangular housing portion having a portion thereof received in slidable telescoping engagement with said first housing portion, a plurality of parallel bus bar conductors supported in said first housing portion in relatively stationary relation thereto, a plurality of parallel bus bar conductors supported in said second housing portion in relatively stationary relation thereto, said bus bars of said first housing portion including contact portions extending in overlapping relation with corresponding contact portions of said bus bars of said second housing portion, said bus bar conductors of said first housing portion having a plurality of aligned apertures in said contact portions, and a clamping member extending transversely of said bus bar contact portions through said aligned apertures and having an actuatable terminal portion, said bus bar conductors of said second housing portion having a plurality of aligned elongated slots in said contact portions receiving said transverse clamping member, said second housing portion including an elongated aperture through which said terminal portion of said transverse clamping member extends to be exposed for actuation from outside of said adjustable-length section, and slidable closure means operated by said clamping member in response to sliding movement of said second housing portion relative to said first housing portion for closing all portions of said elongated aperture except the portion through which said terminal portion of said clamping member extends, in all adjusted positions of said adjustable section.

3. An adjustable-length busway section comprising two telescopically engaged busway portions each including a generally rectangular elongated housing and a plurality of parallel bus bar conductors supported in insulated relation therein, the bus bar conductors of one of said portions overlapping the bus bar conductors of the other of said portions, clamping means for clamping said overlapping bus bar conductors together transversely of said housing within said telescopically engaged portions, said clamping means being fixed against substantial movement in the direction of adjustment of the adjustable-length section with respect to one of said housings, the other of said housings having an elongated access opening permitting access to said clamping means in all adjusted positions of said adjustable-length section, and sliding closure means operated by said clamping means in response to movement of the other of said housings for closing all portions of said elongated aperture except said access portion in all adjusted positions of said adjustable-length section, said overlapping bus bar conductor of one of said portions comprising tubular portions and said overlapping bus bar conductors of the other of said portions comprising strap-like portions received within said tubular portions.

4. An adjustable-length busway section comprising two telescopically engaged busway portions, each of said busway portions including an elongated generally rectangular busway housing and a plurality of parallel bus bar conductors supported in insulating relation therein, said bus bar conductors of both of said portions including portions overlapping each other, clamping means for clamping said overlapped bus bar portions together transversely of said housings comprising a plurality of aligned apertures in said overlapped bus bar portions, a tubular member of insulating material passing through all of said aligned apertures, a plurality of insulating spacer members extending between said bus bar conductors and surrounding said insulating tubular member, a first elongated clamping member extending within said insulating tubular member and having a headed portion overlying an insulating spacer at one side of said bus bar assembly and having a tapped axial bore extending therewithin from the other end thereof, a second clamping member comprising an elongated threaded bolt extending within said axial bore in threaded engagement therewith from the other side of said bus bar assembly and having a headed portion, a generally tubular pressure member surrounding said clamping bolt under said headed portion of said bolt, resilient energy storing means extending generally coaxially with said clamping bolt between said pressure member and one of said insulating spacer members, said clamping bolt being moved inwardly of said axial bore in response to rotation thereof to exert a compressive force on said resilient means urging said insulating spacer against the side of said assembly of overlapped bus bar conductors to compress all of said bus bar conductors and insulating spacer members together and toward said headed end of said first retaining member, one of said housings including an elongated access opening through which the headed portion of the clamping bolt extends, and sliding closure means operated by said pressure member in response to telescoping movement of said busway portions for closing all portions of said elongated opening except said access portion in all adjusted positions of said adjustable length section.

5. An adjustable-length busway section comprising a plurality of parallel bus bar conductors each including two relatively movable sections having contact portions extending in overlapping relation, said conductor sections being slidable relative to one another to vary the effective length of said conductors, a housing surrounding said overlapping contact portions having an aperture elongated in the direction of extension of said conductors each of said contact portions having an opening with certain of said openings being elongated in the direction of extension of said conductors, and clamping means for clamping said contact portions together including a single clamping bolt extending through each of said openings and through said aperture, said bolt having an actuatable terminal part positioned externally of the housing.

6. An adjustable-length busway section comprising a plurality of parallel bus bar conductors each including two relatively movable sections having contact portions extending in overlapping relation, said conductor sections being slidable relative to one another to vary the effective length of said conductors, a housing surrounding said overlapping contact portions having an aperture elongated in the direction of extension of said conductors, each of said contact portions having an opening with certain of said openings being elongated in the direction of extension of said conductors, clamping means for clamping said contact portions together including a single clamping bolt extending through each of said openings and through said aperture, said bolt having an actuatable terminal part positioned externally of the housing, and slidable closure means operated by said clamping means for closing all portions of said elongated aperture except the portion through which said terminal part extends.

References Cited in the file of this patent

UNITED STATES PATENTS

| | | |
|---|---|---|
| 2,042,105 | Kelley | May 26, 1936 |
| 2,043,796 | Frank | June 9, 1936 |
| 2,261,857 | Novak et al. | Nov. 4, 1941 |
| 2,264,075 | Frank | Nov. 25, 1941 |
| 2,653,990 | Brant | Sept. 29, 1953 |
| 2,653,991 | Dyer et al. | Sept. 29, 1953 |
| 2,727,939 | Wallace et al. | Dec. 20, 1955 |
| 2,732,420 | Sillman | Jan. 24, 1956 |
| 2,870,240 | Stieglitz | Jan. 20, 1959 |
| 2,906,811 | Fisher | Sept. 29, 1959 |
| 2,913,513 | Dyer et al. | Nov. 17, 1959 |

FOREIGN PATENTS

| | | |
|---|---|---|
| 123,336 | Austria | June 10, 1931 |
| 557,332 | Great Britain | Nov. 16, 1943 |
| 535,518 | Belgium | Feb. 28, 1955 |
| 763,660 | Great Britain | Dec. 12, 1956 |